(12) United States Patent
Marini et al.

(10) Patent No.: US 11,295,040 B2
(45) Date of Patent: Apr. 5, 2022

(54) DESIGNING A MECHANICAL PART

(71) Applicant: DASSAULT SYSTEMES, Velizy-Villacoublay (FR)

(72) Inventors: Laurent Marini, Velizy-Villacoublay (FR); Quentin Freger, Velizy-Villacoublay (FR)

(73) Assignee: DASSAULT SYSTEMES, Velizy-Villacoublay (FR)

( * ) Notice: Subject to any disclaimer, the term of this patent is extended or adjusted under 35 U.S.C. 154(b) by 44 days.

(21) Appl. No.: 16/727,169

(22) Filed: Dec. 26, 2019

(65) Prior Publication Data

US 2020/0210631 A1 Jul. 2, 2020

(30) Foreign Application Priority Data

Dec. 26, 2018 (EP) .................................... 18306849

(51) Int. Cl.
| | | |
|---|---|---|
| G06F 17/10 | (2006.01) | |
| G06F 30/10 | (2020.01) | |
| G06F 30/12 | (2020.01) | |
| G06F 30/15 | (2020.01) | |
| G06F 30/17 | (2020.01) | |

(52) U.S. Cl.
CPC .............. *G06F 30/10* (2020.01); *G06F 30/12* (2020.01); *G06F 30/15* (2020.01); *G06F 30/17* (2020.01)

(58) Field of Classification Search
CPC ................................. G06F 30/00; G06F 30/10
USPC ............................................................ 703/1
See application file for complete search history.

(56) References Cited

U.S. PATENT DOCUMENTS 4,791,583 A 12/1988 Colburn
7,814,441 B2 * 10/2010 Bae ......................... G06T 17/20
345/420

(Continued)

FOREIGN PATENT DOCUMENTS

EP 2 028 623 A1 2/2009
EP 3098734 A1 * 11/2016 ......... G06F 16/5854
EP 3 340 084 A1 6/2018

OTHER PUBLICATIONS

Jiao, Xiangmin et al. "Identification of C1 and C2 discontinuities for surface meshes in CAD", Computer-Aided Design 40 (2008) pp. 160-175 (Year: 2008).*

(Continued)

Primary Examiner — Andre Pierre Louis
(74) Attorney, Agent, or Firm — Oblon, McClelland, Maier & Neustadt, L.L.P.

(57) ABSTRACT

The disclosure notably relates to a computer-implemented method for designing, with a CAD system, a 3D modeled object representing a mechanical part. The method includes providing a B-rep representing the mechanical part. The B-rep has faces, edges and vertices. The method includes providing a sharp edge. The method further includes, automatically by the CAD system, identifying a set of edges. The set of edges includes the provided sharp edge. Each first edge of the set of edges is directed similarly to at least one second edge of the set of edges, the first edge and the second edge sharing a face. The method further includes, automatically by the CAD system, selecting sharp edges within the set of edges. Such a method constitutes an improved method for designing a mechanical part.

16 Claims, 12 Drawing Sheets

(56) References Cited

U.S. PATENT DOCUMENTS

| | | | |
|---|---|---|---|
| 8,421,798 B2* | 4/2013 | Rameau | G06T 17/10 345/419 |
| 2016/0188770 A1* | 6/2016 | Montana | G05B 19/4069 700/97 |

OTHER PUBLICATIONS

Sridharan, Nandakumar et al. "Recognition of Multi-Axis Milling Features: Part II—Algorithms & Implementation", Journal of Computing and Information Science in Engineering, vol. 5 pp. 25-34, Mar. 2005 (Year: 2005).*

Sridharan, Nandakumar "Recognition of Multi-Axis Milling Features: Part I—Topological and Geometric Characteristics", Transactions of the ASME, vol. 4 pp. 242-250, Sep. 2004 (Year: 2004).*

Mortara Michela et al., "Blowing Bubbles for Multi-Scale Analysis and Decomposition of Triangle Meshes", Algorithmica vol. 38 pp. 227-248, Oct. 2003 (Year: 2003).*

Extended Search Report dated Jun. 19, 2019 in Europe Patent Application No. 18306849.3- 1224; 12 pgs.

Office Action dated Sep. 27, 2021 in European Patent Application No. 18 306 849.3-1224; 9 pgs.

Anonymous: "Select Menu/Maya/Autodesk Knowledge Network", Aug. 13, 2018; XP055841764; Retrieved from the Internet: URL:https://knowledge.autodesk.com/support/maya/learn-explore/caas/CloudHelp/cloudhelp/2018/ENU/Maya-Basics/files_GUID-D1BBC051-0EE7-4A91-B4FF-2A39764EC8B-htm.html; retrieved Sep. 16, 2021.

* cited by examiner

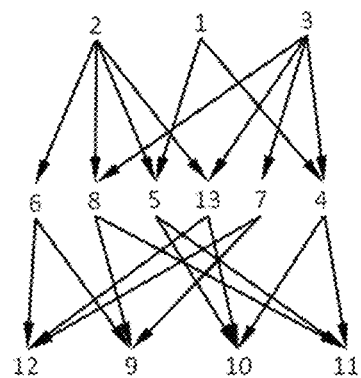
FIG. 6
1 → Plane
2 → Cylindrical surface
3 →
4 →
5 → Circle 1
6 →
7 → Circle 2
8 → Line 1
13 → Line 2
10 → Point 1
11 → Point 2
12 → Point 3
9 → Point 4
FIG. 7
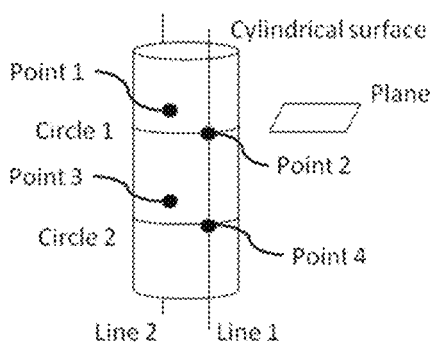
FIG. 8
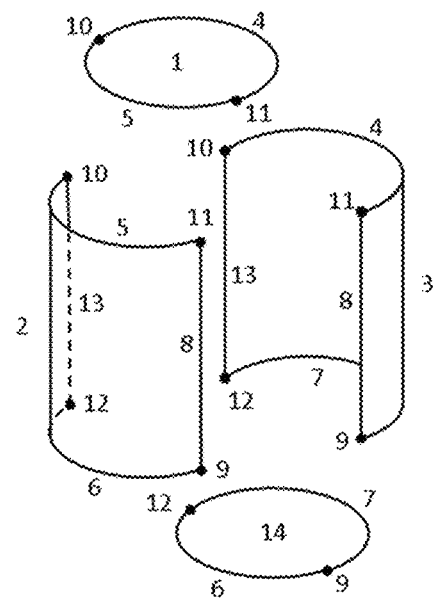
FIG. 9

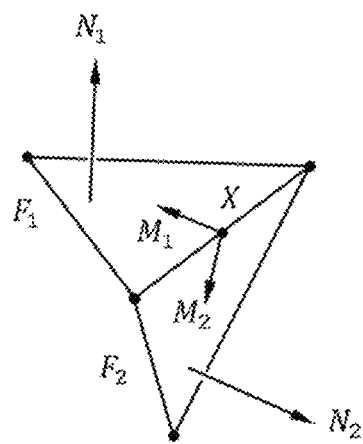
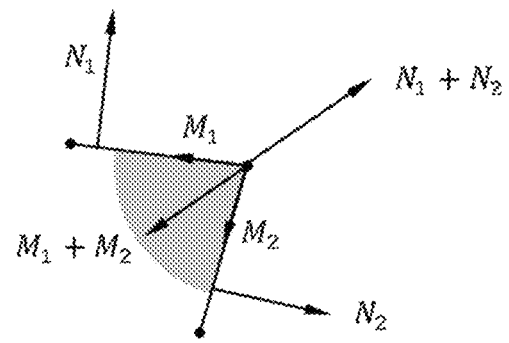
FIG. 14  FIG. 15
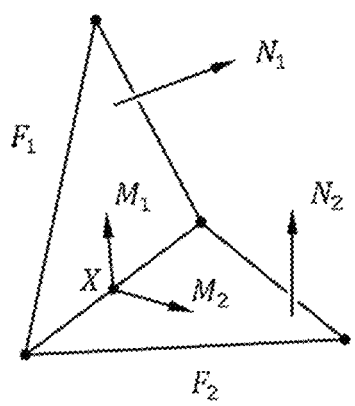
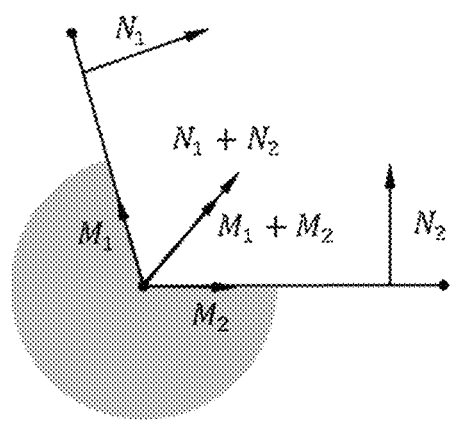
FIG. 16  FIG. 17

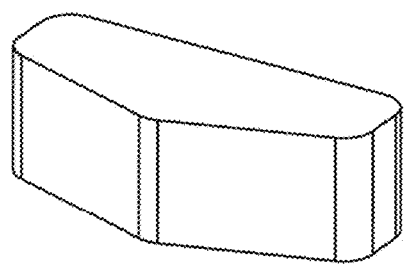
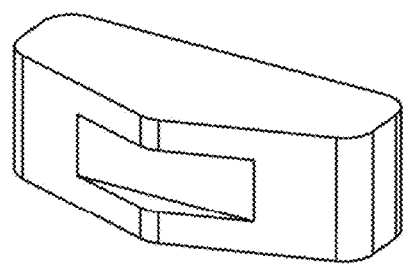
FIG. 34
FIG. 35
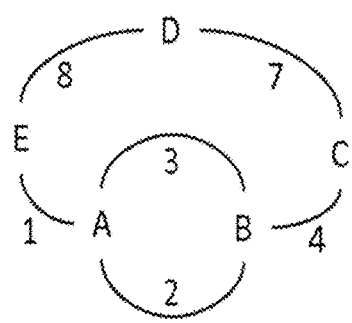
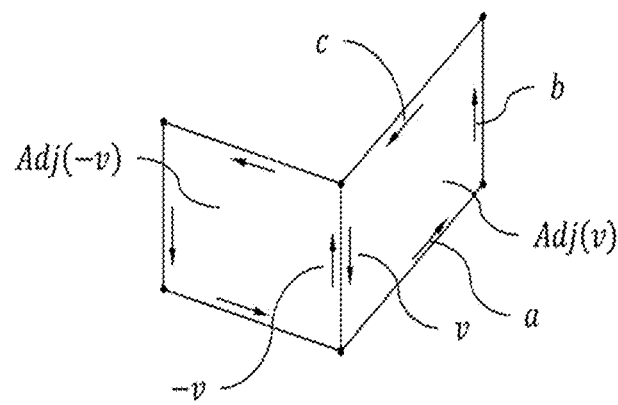
FIG. 36
FIG. 37

DESIGNING A MECHANICAL PART

CROSS-REFERENCE TO RELATED APPLICATIONS

This application claims priority under 35 U.S.C. § 119 or 365 to European Application No. 18306849.3, filed Dec. 26, 2018. The entire contents of the above application(s) are incorporated herein by reference.

FIELD OF THE INVENTION

The disclosure relates to the field of computer programs and systems, and more specifically to a method, system and program for designing with a CAD system a 3D modeled object representing a mechanical part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Mechanical part design may require the multi-selection of edges of interest of a B-rep representing the mechanical part. Existing methods for multi-selection of edges are not efficient. These methods suffer from a lack of efficiency and/or ergonomics.

Within this context, there is still a need for an improved method for designing a 3D modeled object representing a mechanical part.

SUMMARY OF THE INVENTION

It is therefore proposed a computer-implemented method for designing, with a CAD system, a 3D modeled object representing a mechanical part. The method comprises providing a B-rep representing the mechanical part. The B-rep has faces, edges and vertices. The method comprises providing a sharp edge. The method further comprises, automatically by the CAD system, identifying a set of edges. The set of edges comprises the provided sharp edge. Each first edge of the set of edges is directed similarly to at least one second edge of the set of edges, the first edge and the second edge sharing a face. The method further comprises, automatically by the CAD system, selecting sharp edges within the set of edges.

Such a method constitutes an improved method for designing a mechanical part.

Notably, the method allows the selection of several sharp edges. Furthermore, the one or more sharp edges are selected among the identified set of edges. The identified set of edges comprises the provided sharp edge, and edges of the identified set sharing a face are at least two-by-two directed similarly. In other words, edges of the set of edges are relatively similar to one another, and the selected sharp edges are thus relatively like the provided sharp edge. The method thus allows like-edge detection and like-edge multi-selection. In addition, the identification of the set of edges and the subsequent selection of sharp edges are carried out automatically, in other words without involving user actions. Several sharp edges are selected automatically upon the providing of only one sharp edge. The method is thus ergonomic and efficient.

The method may comprise one or more of the following:
- two edges are directed similarly if their angle is lower than a predetermined threshold;
- the predetermined threshold is a function of a manufacturing process of the mechanical part;
- the mechanical part is a molded or forged part having a maximal draft angle, the predetermined threshold being based on the maximal draft angle;
- the mechanical part is a machined part having a maximal machining inclination angle, the predetermined threshold being based on the maximal machining inclination angle;
- the predetermined threshold is lower than 20°, 15° or 10°;
- the set of edges represents one or more paths of a cutting tool for machining a geometry corresponding to an outer surface portion of the mechanical part defined along the set of edges;
- the method further comprises applying a same fillet or round operation to the selected sharp edges;
- a radius of the fillet or round operation corresponds to a radius of the cutting tool;
- the mechanical part is a machined part, a molded part, a machined mold for a molding manufacturing process, a forged part, and/or a machined forging matrix for a forging manufacturing process;
- the set of edges corresponds to a mass reduction feature, a space reservation feature, a fixture feature, a tightness feature, an adjustment feature, a mechanical joint feature, a cooling feature, a stiffening feature, a positioning feature, and/or a support for all machined and drilled protrusion feature;
- the selected sharp edges each have a neighboring convexity identical to the provided sharp edge; and/or
- the neighboring convexity of an edge is the couple of the convexity types of its end vertices, where:
  - an end vertex of the edge has the concave type if all edges sharing the vertex are concave edges;
  - an end vertex of the edge has the convex type if all edges sharing the vertex are convex edges; and
  - an end vertex of the edge has the both concave and convex type if at least one edge sharing the vertex is a concave edge and at least one edge sharing the vertex is a convex edge.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the disclosure will now be described, by way of non-limiting example, and in reference to the accompanying drawings, where:

FIGS. 4, 5, 6, 7, 8, 9, 10, 11, 12, 13, 14, 15, 16, 17, 18, 19, 20, 21, 22, 23 and 24 illustrate B-rep concepts involved in the method;

FIGS. 25, 26, 27, 28, 29, 30, 31, 32, 33, 34, 35, 36, and 37 illustrate the method;

DETAILED DESCRIPTION OF THE INVENTION

Figure 1:
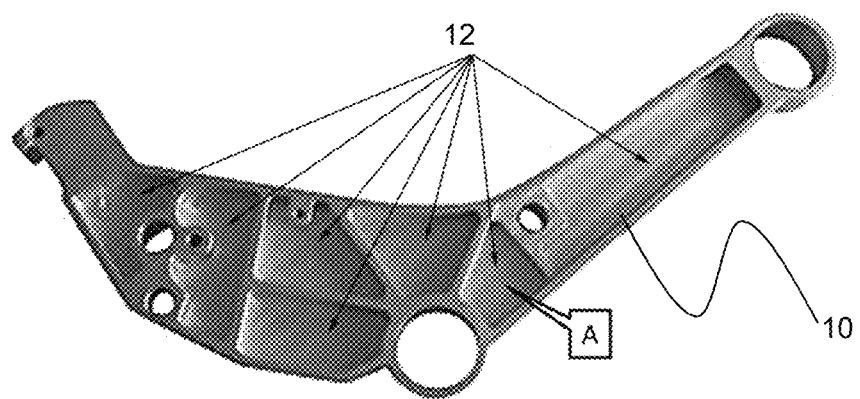
FIGS. 1, 2 and 3 show examples of mechanical parts designed by the method.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. The system may be a CAD system, and modeled objects are defined by corresponding data. One may accordingly speak of CAD object.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

In examples, the mechanical part may be one or a plausible combination of a machined part (i.e. a part manufactured by a machining manufacturing process), a molded part (i.e. a part manufactured by a molding manufacturing process), a machined mold (i.e. a mold manufactured by a machining manufacturing process) for a molding manufacturing process (i.e. for manufacturing one or more molded parts), a forged part (i.e. a part manufactured by a forging manufacturing process) and/or a machined forging matrix (i.e. a forging matrix manufactured by a machining manufacturing process) for a forging manufacturing process (i.e. for manufacturing one or more forged parts). A machined part may be a machined forging matrix. Additionally or alternatively, a machined part may be a machined mold.

Figure 2:
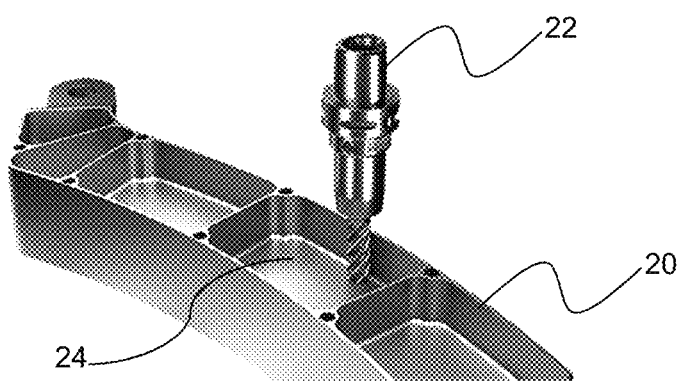
Figure 3:
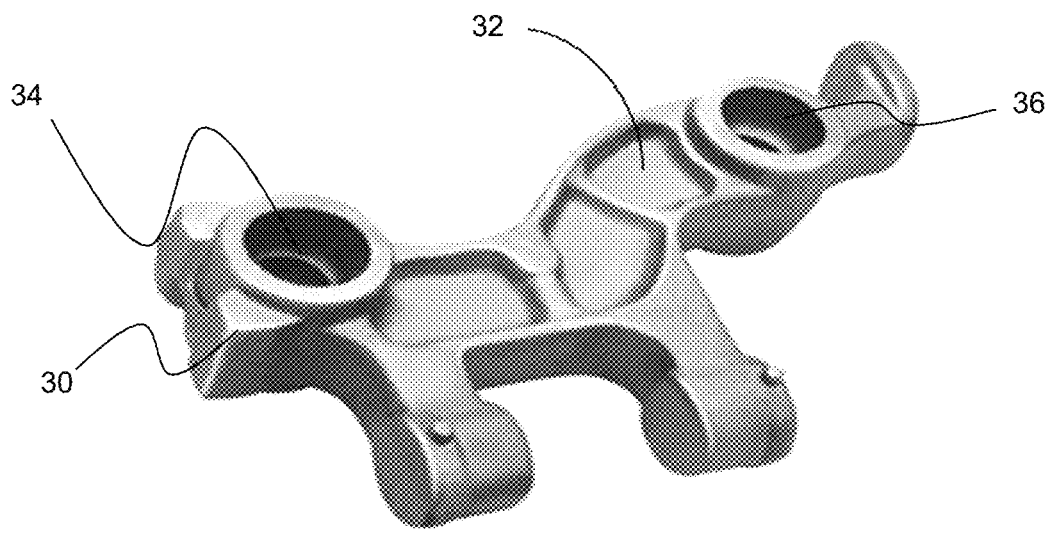

FIGS. 1-3 illustrate three examples of mechanical parts designed by the method. In FIG. 1, the mechanical part is an aluminum aerospace machined part 10. In FIG. 2, the mechanical part is an aerospace machined part 20. FIG. 2 further shows a cutting tool 22 used for the machining of the part 20. In FIG. 3, the mechanical part is an automotive forged part 30.

The providing of the B-rep representing the mechanical part is now discussed.

The B-rep is a 3D representation of the mechanical part. Specifically, the B-rep (i.e. boundary representation) is a persistent data representation describing the 3D modeled object representing the mechanical part. The B-rep may be the result of computations and/or a series of operations carried out during a designing phase of the 3D modeled object representing the mechanical part. The shape of the mechanical part displayed on the screen of the computer when the modeled object is represented is (e.g. a tessellation of) the B-rep. In examples, the B-rep represents a part of the model object.

Figure 4:
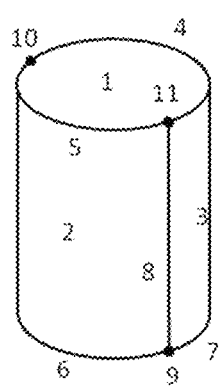
Figure 5:
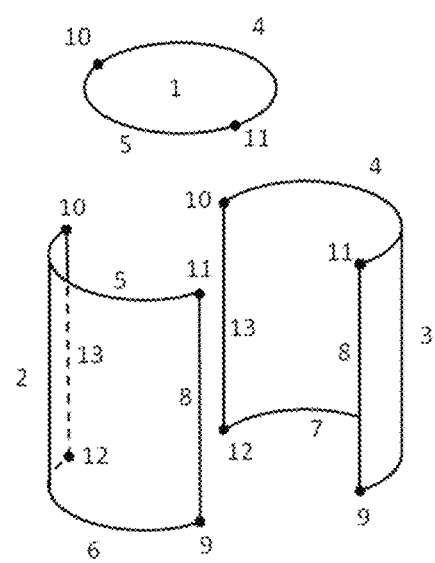

A B-Rep includes topological entities and geometrical entities. Topological entities are: face, edge, and vertex. Geometrical entities are 3D objects: surface, plane, curve, line, point. By definition, a face is a bounded portion of a surface, named the supporting surface. An edge is a bounded portion of a curve, named the supporting curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected by sharing vertices. Faces are connected by sharing edges. Two faces are adjacent if they share an edge. Similarly, two edges are adjacent if they share a vertex. FIG. 4-5 illustrates a B-rep of a cylindrical slot made of three faces: top planar face and two lateral cylindrical faces. FIG. 4 shows the perspective view of the slot. Visible faces, edges and vertices are numbered. FIG. 5 shows the exploded view of all faces. Duplicated numbers illustrate edges and vertices sharing. Face 1 is a bounded portion of a plane. Boundary of face one includes edges 4 and 5, each of them being bounded by vertices 10 and 11. They both have the same supporting circle. Face 2 is bounded by edges 6, 8, 5 and 13 all lying on an infinite cylindrical surface. Faces 1 and 2 are adjacent because they share edge 5. Faces 2 and 3 are adjacent because they share edges 8 and 13. Faces 1 and 3 are adjacent because they share edge 4. FIG. 6 shows a graph illustrating the "is bounded by" topological relationship of the B-Rep of FIG. 4. Nodes of higher layer are faces, nodes of intermediate layer are edges and nodes of lower layer are vertices. FIG. 7 shows a graph illustrating the relationship between topological entities (faces, edges, vertices) of the B-rep of FIG. 4. FIG. 8 shows the supporting geometries of the B-rep of FIG. 4. In the CAD system, the B-Rep gathers in an appropriate data structure the "is bounded by" relationship, the relationship between topological entities and supporting geometries, and mathematical descriptions of supporting geometries.

Figure 10:
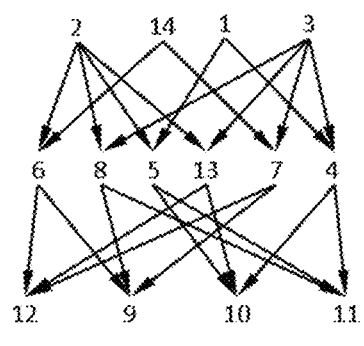

An internal edge of a B-Rep is an edge shared by exactly two faces. By definition, a boundary edge is not shared, it bounds only one face. By definition, a boundary face is bounded by at least one boundary edge. A B-Rep is said to be closed if all its edges are internal edges. A B-Rep is said to be open is it includes at least one boundary edge. The B-Rep of the example shown in FIG. 4 is open because edges 6 and 7 are boundary edges. Conversely, edges 4, 5, 8 and 13 are internal edges. A closed B-Rep is obtained from the example of FIG. 4 by adding disk-like face 14 bounded by edges 6 and 7 as illustrated in FIG. 9. FIG. 10 shows a graph illustrating the "is bounded by" topological relationship of the closed B-Rep of FIG. 9. A closed B-Rep is used to model a thick 3D volume because it defines the inside portion of space (virtually) enclosing material. An open B-Rep is used to model a 3D skin, which represents a 3D object the thickness of which is sufficiently small to be ignored.

Figure 11:
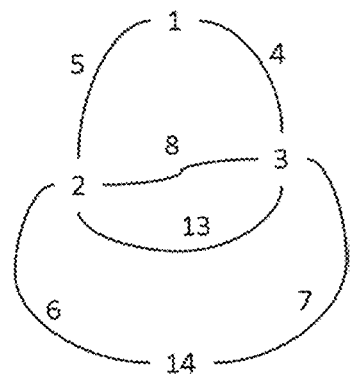

The dual graph of the B-Rep is a logical graph that captures faces adjacencies only. It is defined as follows. Nodes of the dual graph are associated with faces of the B-Rep and arcs of the dual graph are associated with edges of the B-Rep. An arc of the dual graph connects two nodes of the dual graph if the B-Rep edge associated with the arc is shared by the B-Rep faces respectively associates with nodes. FIG. 11 shows the dual graph of the closed B-rep of FIG. 9. Arcs are labeled with edges numbers.

In the context of the method, a ribbon is a set of faces and edges captured by a connected subgraph of the dual graph. In other words, faces of the ribbon are associated with the nodes of the connected subgraph and edges of the ribbon are associated with the arcs of the connected subgraph. The faces of the ribbon form an arcwise connected part of the B-rep. In examples, the connected subgraph is or comprises a cycle. In examples, the connected subgraph comprises two or more cycles. In examples, the connected subgraph comprises no cycle.

Figure 12:
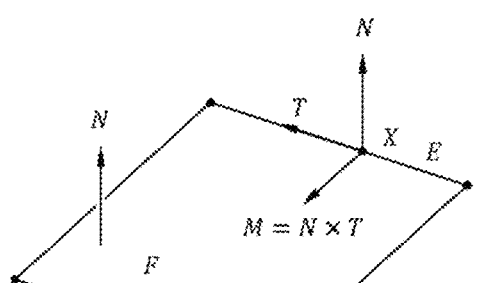
Figure 13:
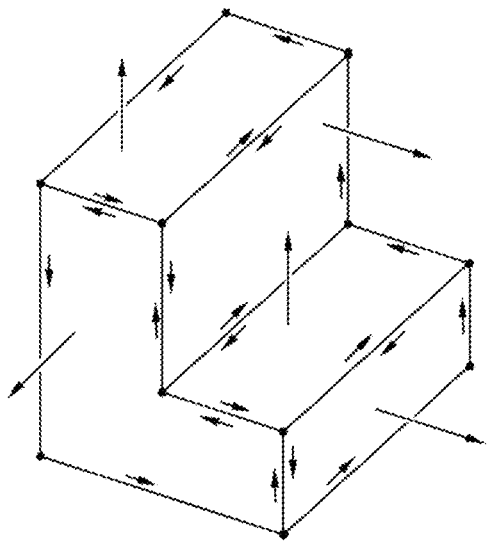

Each face of the B-Rep is equipped with a normal vector, defined with the help of the supporting surface. Firstly, the normal vector is collinear with the normal vector of the supporting surface. In addition, the normal vector of a closed B-Rep representing a mechanical part is directed outside the material. Let F be a face of the B-Rep and N its outer normal vector. Let E be an edge of face F, X a point on edge E and T the normalized tangent vector of edge E at point X. By definition, edge E is oriented counterclockwise if vector $M = N \times T$ is directed toward the inside region of the face, as illustrated by FIG. 12. Notice that since vectors N and T are normalized and perpendicular, then vector M is normalized. By convention, all edges of all faces of a B-Rep are oriented counterclockwise, as illustrated by FIG. 13. Two properties of the B-Rep structure are noticeable. Firstly, each internal edge of a B-Rep is shared by exactly two faces. Secondly, each internal edge is used in opposite orientations by its two incident faces. For these two reasons, given an internal edge of the B-Rep and given an orientation of this edge, there exists only one face bounded by this edge through this orientation. A boundary edge of a B-Rep bounds by only one face, and then is used through only one orientation.

Figure 18:
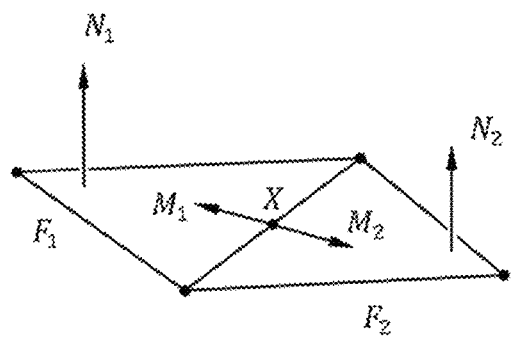
Figure 19:
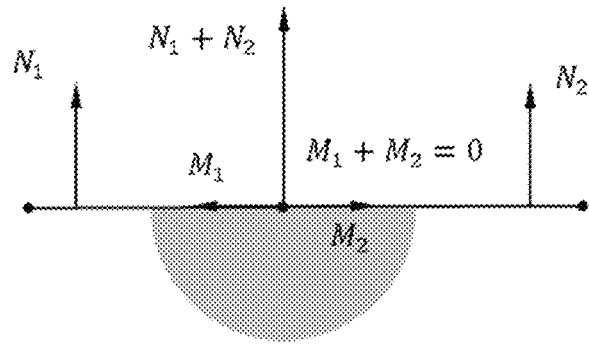
Figure 20:
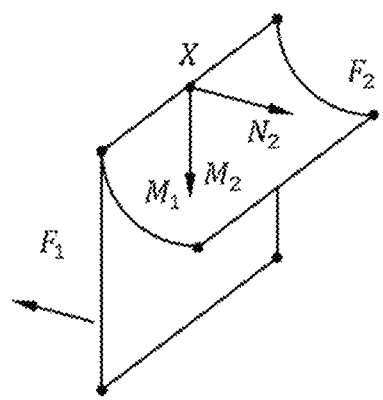
Figure 21:
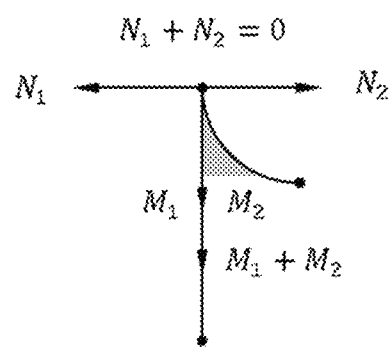

The following discusses the notion of edges convexity. Given the B-Rep of a 3D modeled object, let E be an edge shared by faces $F_1$ and $F_2$, and let X be a point on edge E. Respective outer normal vectors of faces $F_1$ and $F_2$ are noted $N_1$ and $N_2$. Let $P_1$ and $P_2$ be the planes through point X with respective normal vectors $N_1$ and $N_2$. Planes $P_1$ and $P_2$ locally define an outside 3D region and an inside 3D region in the neighborhood of point X. By nature, vector $N_1+N_2$ points to the outside 3D region. Let $M_1$ and $M_2$ be the respective material vectors of point X with respect to faces $F_1$ and $F_2$. By nature, vector $M_1+M_2$ points to the convex 3D region. By definition, edge E is convex at point X if $N_1+N_2$ and $M_1+M_2$ have opposite directions, i.e. if $\langle M_1+M_2, N_1+N_2 \rangle <0$, as illustrated in FIGS. 14 and 15. Edge E is convex if it is convex at all points. Conversely, edge E is said to be concave at point X if $N_1+N_2$ and $M_1+M_2$ have the same direction, i.e. if $\langle M_1+M_2, N_1+N_2 \rangle >0$, as illustrated in FIGS. 16 and 17. Edge E is concave if it is concave at all points. Otherwise, $\langle M_1+M_2, N_1+N_2 \rangle =0$ meaning that the edge is either a smooth edge or a knife edge. A smooth edge is such that $M_1+M_2=0$ and $N_1=N_2$ as illustrated in FIGS. 18 and 19. It usually occurs in B-Rep of typical mechanical parts. A knife edge is such that $N_1+N_2=0$ and $M_1=M_2$ as illustrated in FIGS. 20 and 21. Knife edge is described for completeness, it is not usually used for modeling mechanical parts.

Figure 22:
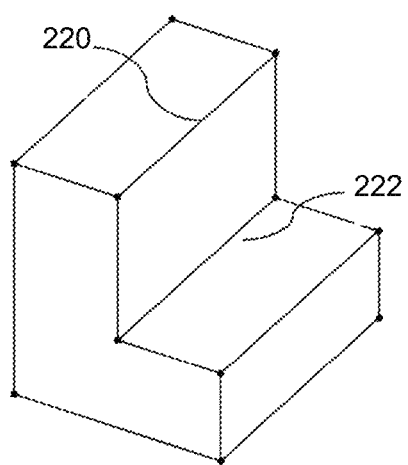
Figure 23:
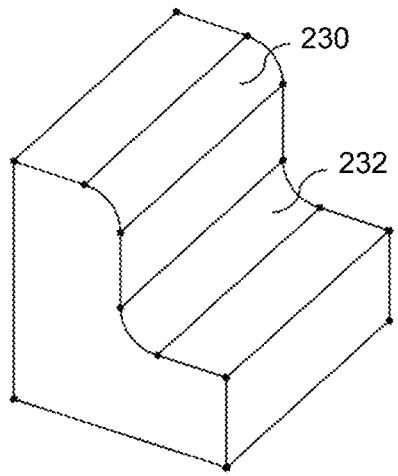
Figure 24:
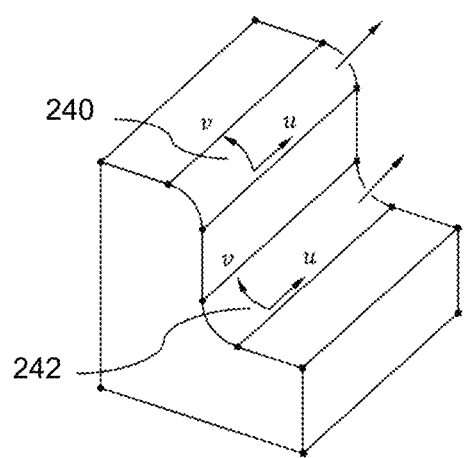

From the geometrical point of view, a round face replaces a convex sharp edge by a smooth transition. The transition face is the envelope of a rolling ball connecting the adjacent faces of the initial sharp edge. Similarly, a fillet face replaces a concave sharp edge by a smooth transition based on the same rolling ball geometry. FIG. 22 and FIG. 23 illustrate the geometry of round and fillet faces. FIG. 22 shows a convex edge 220 and a concave edge 222. FIG. 23 shows a round face 230 and a fillet face 232 obtained by replacing respectively edge 220 and edge 222 by smooth transitions based on rolling ball geometries. Just like canonical surfaces (such as cylinder, plane, sphere, cone) round faces and fillet faces are generally equipped with a logical type in the B-Rep data structure. If this logical type is missing they can be recognized as follows. The parameterization $S:[a,b]\times[c,d] \to \mathbb{R}^3$ with $(u,v) \mapsto S(u,v)$ is such that for all $u \in [a,b]$ the curve $v \mapsto S(u,v)$ is a portion of a circle the radius of which does not depend on u. Or, for all $v \in [c,d]$ the curve $u \mapsto S(u,v)$ is a portion of a circle the radius of which does not depend on v. If the outer normal vector of the B-rep is oriented toward the concave side of the circle, then the face supported by surface S is a round surface. If the outer normal vector of the B-rep is oriented toward the convex side of the circle, then the face supported by surface S is a fillet surface. FIG. 24 illustrates the parameterization of a round face 240 and of a fillet face 242. Round faces and fillet faces respectively behave like convex edges and concave edges. This is because, from the mechanical point of view, a round face is a smooth transition replacing a convex sharp edge, and a fillet face is a smooth transition replacing a concave sharp edge. This typically occurs when designing mechanical parts manufactured through molding and machining methods.

The providing of the B-rep may comprise displaying the B-rep on a display of the CAD system. The providing of the B-rep may result from an action of a user, e.g. an interaction between the user and the CAD system of the method. In examples, the 3D modeled object (e.g. partly) represented by the B-rep may have been designed by another user on another CAD system and optionally stored in a memory and/or sent (e.g. through a network) to the CAD system of the method. The providing of the B-rep may comprise retrieving the B-rep from a memory. In examples, the user and the another user are different, and the CAD system of the method and the another CAD system are different. In these examples, the CAD system of the method and the another CAD system may be connected by a network. In examples, the user and the another user are the same, and the CAD system of the method and the another CAD system are the same.

The providing of the sharp edge is now discussed.

Providing the sharp edge may designate any action which results in specifying (e.g. selecting, e.g. choosing) one sharp edge among edges of the B-rep, the one sharp edge being the provided sharp edge. The provided sharp edge may form data which is an input of the identifying of the set of edges and of the selecting of the sharp edges, e.g. an input of one or more algorithms involved in the identifying of the set of edges and in the selecting of the sharp edges. In examples, the provided sharp edge is an edge of a ribbon. In these examples, the ribbon may comprise a set of edges which comprises two or more edges. In these examples, each first edge of the ribbon is directed similarly to at least one second edge of the ribbon with which the first edge shares a face. The ribbon may comprise two or more sharp edges. In these examples, one or more sharp edges of the two or more sharp edges may have a neighboring convexity identical to the provided sharp edge. In examples, all sharp edges of the two or more sharp edges have a neighboring convexity identical to the provided sharp edge.

In examples, the providing of the sharp edge is carried out by a user. The providing of the sharp edge by the user may for instance comprise a selection of the sharp edge by the user. In these examples, the B-rep may be displayed on a display of the CAD system and the user may for example select the sharp edge on the displayed B-rep, by graphical interaction with the sharp edge. Selecting the sharp edge may comprise clicking (e.g. with a haptic device such as a mouse) on or substantially on the sharp edge. Alternatively, selecting the sharp edge by graphical interaction with the sharp edge may comprise performing a touch (e.g. with a finger of the user) on or substantially on the sharp edge.

Alternatively, the providing of the sharp edge may be carried out automatically by the CAD system.

The set of edges is now discussed. In the following, the set of edges may be referred to as "the identified set of edges".

Each first edge of the set of edges is directed similarly to at least one second edge of the set of edges. As the provided sharp edge is comprised in the set of edges, the provided sharp edge is directed similarly to one or more other edge of the set of edges. In examples, the set of edges comprises two or more sharp edges. In examples, two or more sharp edges of the set of edges are directed similarly to the provided sharp edge. In examples, all sharp edges of the set of edges are directed similarly to the provided sharp edge.

In examples, the edges of the set of edges are the edges of a ribbon. In these examples, since faces of the ribbon form an arcwise connected part of the B-rep, since the provided sharp edge is comprised in the ribbon, and since each first edge of the set of edges is directed similarly to at least one second edge of the ribbon with which it shares a face, the following holds: each first edge of the set of edges is directed similarly to at least one second edge of the set of edges with which it shares a face, each second edge being itself directed similarly to at least one third edge of the set of edges with which it shares a face, . . . , each $(n-1)^{th}$ edge being itself directed similarly to at least one $n^{th}$ edge of the set of edges with which it shares a face, each $n^{th}$ edge itself sharing a face with the provided sharp edge and being directed similarly to the provided sharp edge. In other words, in these examples, upon the providing of the sharp edge, the method automatically identifies one or more lists of edges, each list comprising the provided sharp edge, edges of each list being two-by-two directed similarly. In these examples, the one or more lists of edges form the set of edges. In examples, the identified set of edges is made of the edges of the largest ribbon which contains the provided sharp edge and of which each first edge is directed similarly to at least one second edge with which the first edge shares a face.

Figure 25:
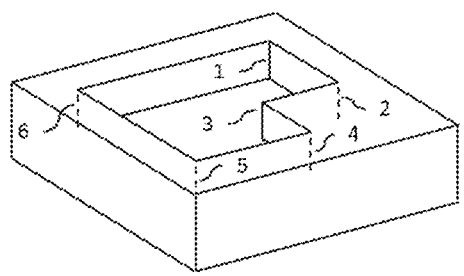
Figure 26:
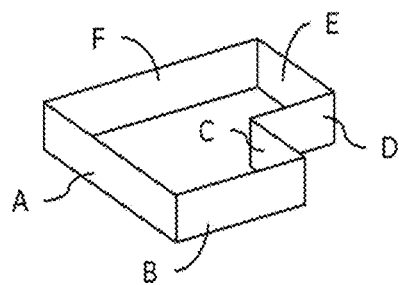

An example of the identified set of edges is now discussed with reference to FIGS. 25-27. FIG. 25 shows an example of (e.g. a part of) a B-rep provided according to the method. Edges 1, 2, 3, 4, 5 and 6 are sharp edges of the B-rep. FIG. 26 shows faces A, B, C, D, E, F of the B-rep, respectively shared by edges 5 and 6, edges 4 and 5, edges 3 and 4, edges 2 and 3, edges 1 and 2, and edges 1 and 6. Edge 1 is the sharp edge provided according to the method, for instance by a user interacting graphically with the sharp edge. Edges 1, 2, 3, 4, 5, 6 and faces A, B, C, D, E, F form a ribbon, captured by the graph of FIG. 27, which is a connected subgraph of the dual graph of the (e.g. part of the) B-rep of FIG. 25. The connected subgraph is here a cycle. Edges 1, 2, 3, 4, 5 and 6 form the identified set of edges. In other words, the method may automatically identify the set of edges as the list of edges {1, 2, 3, 4, 5, 6}. Each first edge of this list is directed similarly to each second edge of this list with which the first edge shares a face. In other words, edges of the list are two-by-two directed similarly.

Figure 28:
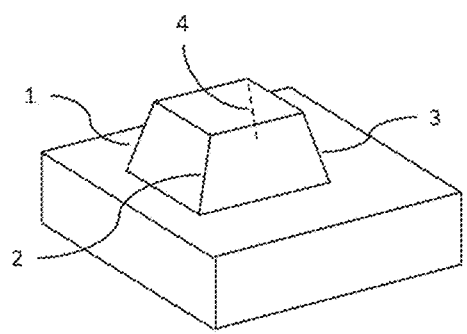
Figure 29:
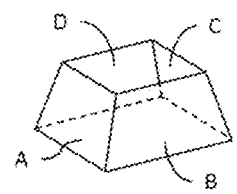

Another example of the identified set of faces is now discussed with reference to FIGS. 28-30. FIG. 28 shows an example of a (e.g. part of a) B-rep provided according to the method. Edges 1, 2, 3 and 4 are sharp edges of the B-rep. FIG. 29 shows faces A, B, C, D of the B-rep, respectively shared by edges 1 and 2, edges 2 and 3, edges 3 and 4, and edges 1 and 4. Edge 1 is the sharp edge provided according to the method. Edges 1, 2, 3, 4 and faces A, B, C, D form a ribbon, captured by the graph of FIG. 30, which is a connected subgraph of the dual graph of the (e.g. part of the) B-rep of FIG. 28. The connected subgraph is here a cycle. Edges 1, 2, 3, 4 form the identified set of edges. In other words, the method may automatically identify the set of edges as the list of edges {1, 2, 3, 4}. Each first edge of this list is directed similarly to each second edge of this list with which the first edge shares a face. In other words, edges of the list are two-by-two directed similarly.

In examples, the method is thus able to identify all edges of a ribbon which comprises the provided sharp edge. The method allows thus to identify one or more lists of edges which are two-by-two directed similarly, each list containing the provided sharp edge. In other words, the method identifies edges which are relatively like the first edge. The identification is moreover automatically carried out by the CAD system, without any user action. The method thus performs an ergonomic and efficient like-edge detection.

In examples, the set of edges represents one or more paths of a cutting tool for machining a geometry corresponding to an outer surface portion of the mechanical part defined along the set of edges. The cutting tool may be a milling tool.

Upon the providing of the sharp edge, the method thus identifies automatically edges representing one or more paths of the cutting tool. In other words, the method identifies automatically one or more paths of the cutting tool.

In examples, the geometry corresponding to the outer surface portion of the mechanical part is the geometry of the outer surface portion of the mechanical part defined along the set of edges. In these examples, the outer surface portion of the mechanical part may comprise the outer surface of one or more layouts of material of the mechanical part.

Alternatively, the geometry corresponding to the outer surface portion of the mechanical part may be the geometry of an outer surface portion of a matrix. In these examples, the matrix is used in a manufacturing process to shape the mechanical part. In these examples, the outer surface portion of the matrix shapes the outer surface portion of the mechanical part. In other words, the geometry corresponds to the outer surface portion of the mechanical part in that it is the geometry of an outer surface portion of the matrix which shapes the geometry of the outer surface portion of the mechanical part. The outer surface portion of the matrix may comprise the outer surface of one or more layouts of material of the matrix. The matrix may be a machined forging matrix used to shape the mechanical part in a forging manufacturing process. Alternatively, the matrix may be a machined mold used to shape the mechanical part in a molding manufacturing process.

Machining the geometry corresponding to the outer surface portion of the mechanical part may comprise applying continuously the cutting tool on the outer surface of one or more layouts of material (e.g. of the mechanical part or of a matrix used in a manufacturing process to shape the mechanical part). Applying continuously the cutting tool on a layout of material (e.g. of the one or more layouts of material) may result in changing the geometry of the layout of material. In these examples, machining the geometry corresponding to the outer surface portion of the mechanical part may comprise changing the geometry of the outer surface of the one or more layouts of material by applying the cutting tool on the outer surface of the one or more layouts of material. In these examples, the changed geometry of the outer surface of the one or more layouts of material may form the machined geometry corresponding to the outer surface portion of the mechanical part.

In examples, applying continuously the cutting tool consists in applying the cutting tool during a given period of time without stopping the cutting tool and/or lifting the cutting tool from the mechanical part. In other words, during the given period of time, the cutting tool is continuously working and/or in contact with the material to which it is applied. In these examples, a path of the cutting tool may be the outer surface of a layout of material (e.g. of the mechanical part and/or of a matrix used in a manufacturing process to shape the mechanical part). In these examples, the outer surface of the layout of material has a geometry which is adapted for a continuous application of the cutting tool. The one or more paths may thus form the outer surface of one or more layouts of material (e.g. of the mechanical part and/or of a matrix used in a manufacturing process to shape the mechanical part), the outer surface having a geometry which is adapted for a continuous application of the cutting tool. In other words, given the shape and/or the mechanical properties and/or the geometric properties of the cutting tool, it is mechanically possible and/or realistic and/or easy to apply continuously the cutting tool on such a geometry.

The set of edges represents the one or more paths. In examples, edges of the set of edges bound faces. The bounded faces form a part of B-rep. In examples, the edges of the set are the edges of a ribbon. In these examples, the edges of the set bound the faces of the ribbon. In these examples, the part of the B-rep is the set of faces made of all the faces of the ribbon. The part of the B-rep is thus, in these examples, an arcwise connected part of the B-rep.

Figure 27:
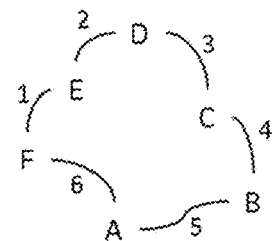

Faces A, B, C, D, E, F of the example of FIG. 25-27 form an example of the part of the B-rep. Faces A, B, C, D of the example of FIG. 28-30 form an example of the part of the B-rep. In examples, the part of the B-rep represents the outer surface of one or more layouts of materials of the mechanical part. In other words, the outer surface of the one or more layout of materials is defined along the set of edges. Such examples are now discussed.

In examples, the one or more paths form the outer surface, represented by the part of the B-rep, of the one or more layouts of material of the mechanical part, the outer surface having a geometry which is adapted for a continuous application of the cutting tool. In other words, in these examples, the set of edges may represent the one or more paths in that the part of the B-rep represents the outer surface of the one or more layouts of material of the mechanical part formed by the one or more paths.

Additionally or alternatively, the one or more paths may form the outer surface of one or more layouts of material of a matrix used in a manufacturing process to shape the mechanical part, the outer surface having a geometry which is adapted for a continuous application of the cutting tool. Shaping a mechanical part may consist in molding the mechanical part in a molding manufacturing process or may consist in forging the mechanical part in a forging manufacturing process. In these examples, the outer surface of the one or more layouts of material of the matrix may shape the outer surface, represented by the part of the B-rep, of the one or more layouts of material of the mechanical part. In other words, in these examples, the set of edges may represent the one or more paths in that the part of the B-rep represents the outer surface of the one or more layouts of material of the mechanical part shaped by the outer surface of the matrix formed by the one or more paths.

The part of the B-rep comprises the provided sharp edge. The provided sharp edge may represent a location on a path of the one or more paths that is an intermediate location, e.g. that is not an extremity of the path. Alternatively, the provided sharp edge may represent a location that is an extremity of one or more paths of the one or more paths. In examples, the extremity is a starting point for the application of the cutting tool. Such examples are now discussed. In these examples, for machining the geometry corresponding to the outer surface portion of the mechanical part, the cutting tool has a starting point, which is a location on an outer surface of the one or more layouts of material (e.g. of the mechanical part and/or of a matrix used in a manufacturing process to shape the mechanical part). The cutting tool is put in contact with the outer surface of the one or more layouts of material at this location. The location is represented by the provided sharp edge. The location is a starting point of the application of the cutting tool in that the cutting tool is put in contact with the outer surface at this point, and the cutting tool may be then turned on and continuously applied by following the one or more paths. In other words, the cutting tool may be continuously applied according to one or more trajectories, each trajectory starting at the starting location represented by the first edge, each trajectory following a respective path of the one or more paths. In other words, the part of the B-rep may correspond to a set of one or more trajectories followed by the cutting tool during its continuous application, e.g. starting at the location represented by the provided sharp edge. Nevertheless, in examples, the part of the B-rep (or, equivalently, the set of edges) only corresponds to the set of one or more trajectories but is not intimately linked to the machining process itself. In other words, the designing of the B-rep may account for features of the machining process and of the tool, as previously discussed, but the true set up and/or development of the machining process may be carried out at a later stage. For example, the starting point and/or the ending point of the cutting tool's application and/or the trajectories of the cutting tool may be truly specified at the later stage.

FIG. 1 shows mass reduction pockets 12 of the aluminum aerospace machined part 10. Each mass reduction pocket, for example mass reduction pocket A, is an example of an outer surface portion in the case of the aluminum aerospace machined part 10. FIG. 2 shows a cutting tool 22 for machining the geometry of the mass reduction pocket 24, the mass reduction pocket 24 being an example of an outer surface portion in the case of the machined aerospace part 20. FIG. 3 shows a mass reduction pocket 32 which is an example of an outer surface portion in the case of the automotive forged part 30. The outer surface portion of the automotive forged part 30 has a geometry shaped by the geometry of the outer surface of a layout of material of a machined forged matrix. The two holes 34 and 36 are space reservation features, which are other examples of outer surface portions of the automotive forged part 30. These outer surface portions have geometries that are shaped by outer surface portions of layouts of material of the machined forged matrix. The two holes may be machined in a subsequent machining process of the part 30.

The notion of "directed similarly" is now discussed.

In examples, two edges sharing a face are directed similarly when the face represents a part of a path of a cutting tool for machining a geometry corresponding to an outer surface portion of the mechanical part defined along the set of edges. In other words, the face shared by the two similar edges may represent a layout of material having an outer geometry adapted for the continuous application of the cutting tool. In examples, a layout of material has a geometry adapted for the continuous application of the cutting tool when the layout of material is not too curvy and/or too bended and/or too folded. Conversely a layout of material has a geometry not adapted for the continuous application of the cutting tool when the continuous application of the cutting tool on the layout of material is unrealistic and/or impossible, e.g. mechanically, e.g. because it would require an unrealistic and/or impossible inclination (e.g. bend) of the cutting tool.

By identifying similarly directed edges, the method thus allows to identify one or more paths of a cutting tool for machining a geometry corresponding to an outer surface portion of the mechanical part defined along the set of edges.

In examples, two edges are directed similarly if their angle is lower than a predetermined threshold.

Let for example $u_1$ and $u_2$ be two edges, $x_1$, $y_1$ the vertices of edge $u_1$, and $x_2$, $y_2$ the vertices of edge $u_2$. Let $\alpha$ be the predetermined threshold. In examples, the angle between edges $u_1$ and $u_2$ is lower than the predetermined threshold $\alpha$ if:

$$\max\{\mathbb{R}_{y_1-x_1,y_2-x_2}, \mathbb{R}_{y_1-x_1,x_2-y_2}\} \cos \alpha \|y_1-x_1\|\|y_2-x_2\|. \tag{1}$$

In examples, the predetermined threshold is provided by a user before the identifying of the set of edges.

In examples, the predetermined threshold is a function of a manufacturing process of the mechanical part.

The set of edges may thus be automatically identified according to the satisfaction of a direction similarity between edges of the set which corresponds to a manufacturing requirement of the mechanical part. In the examples basing the direction similarity of edges on a function of the manufacturing process of the mechanical part results in that the identified set of edges represents one or more paths of a cutting tool for machining a geometry corresponding to an outer surface portion of the mechanical part defined along the set of edges.

The predetermined threshold may be provided semi-automatically. For example, the user may specify the manufacturing process of the mechanical part, and the CAD system automatically determines the predetermined threshold as a function of the manufacturing process. Specifying the manufacturing process may comprise selecting the manufacturing process, e.g. by interacting (e.g. with a touch or a haptic device such as a mouse) with a software of the CAD system. Alternatively, specifying the manufacturing process may comprise declaring the manufacturing process, e.g. by interacting (e.g. with a keyboard) with the CAD system.

In examples where the predetermined threshold is a function of a manufacturing process of the mechanical part, the mechanical part may be a molded or forged part having a maximal draft angle. In these examples, the predetermined threshold is based on the maximal draft angle. Alternatively, in examples where the predetermined threshold is a function of a manufacturing process of the mechanical part, the mechanical part may be a machined part having a maximal machining inclination angle. In these examples, the predetermined threshold is based on the maximal machining inclination angle.

In examples, the predetermined threshold is lower than four times the maximal draft angle, e.g. lower than three times the maximal draft angle, e.g. lower than two times the maximal draft angle. In these examples, the predetermined threshold may be larger than half the maximal draft angle, e.g. larger than the maximal draft angle, e.g. larger than two times the maximal draft angle Alternatively, the predetermined threshold is lower than four times the maximal machining inclination angle, e.g. lower than three times the maximal machining inclination angle, e.g. lower than two times the maximal machining inclination angle. In these examples, the predetermined threshold may be larger than half the maximal machining inclination angle, e.g. larger than the maximal machining inclination angle, e.g. larger than two times the maximal machining inclination angle.

In examples, the maximal draft angle of a plastic molded part equals 1°. In examples the maximal draft angle of an iron molded part or of an aluminum molded part equals 2° or 3°. In examples, the maximal draft angle of a forged part is 5°.

In example, the maximal machining inclination angle of a machined mold for molding plastic parts equals 1°. In examples the maximal machining inclination angle of a machined mold for molding iron parts or aluminum parts equals 2° or 3°. In examples, the maximal machining inclination angle of a machined forging matrix for forging parts is 5°.

In examples, the predetermined threshold is lower than 20°, 15° or 10°.

In the example of FIGS. 25-27, edges 1, 2, 3, 4, 5 and 6 are comprised in the set of edges because the angle between edge 1 and 2 is lower than the predetermined threshold, the angle between edge 2 and 3 is lower than the predetermined threshold, the angle between edge 3 and 4 is lower than the predetermined threshold, the angle between edge 4 and 5 is lower than the predetermined threshold and the angle between edge 5 and 6 is lower than the predetermined threshold. Edges 1, 2, 3, 4, 5, 6 and faces A, B, C, D, E, F bounded by these edges thus correspond to a part of the B-rep with edges which are two-by-two directed similarly. Such a part of the B-rep represents realistically a path of a cutting tool for machining a geometry corresponding to an outer surface portion of the mechanical part.

Figure 30:
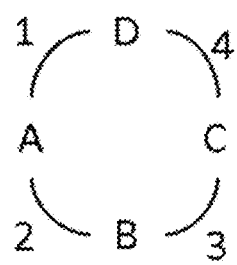

In the examples of FIGS. 28-30, edges 1, 2, 3, 4 are comprised in the set of edges because the angle between edge 1 and 2 is lower than the predetermined threshold, the angle between edge 2 and 3 is lower than the predetermined threshold and the angle between edge 3 and 4 is lower than the predetermined threshold. Edges 1, 2, 3, 4, and faces A, B, C, D bounded by these edges thus correspond to a part of the B-rep with edges which are two-by-two directed similarly. Such a part of the B-rep represents realistically a path of a cutting tool for machining a geometry corresponding to an outer surface portion of the mechanical part.

The selecting of the sharp edges is now discussed.

In examples the selected sharp edges consist in all sharp edges of the identified set of edges. Alternatively, the selected sharp edges may consist in a strict part of the sharp edges of the identified set of edges. In these examples, the provided sharp edge is selected.

In examples, the selected sharp edges each have a neighboring convexity identical to the provided sharp edge.

Sharp edges which have a neighboring convexity identical to the provided sharp edge may form a strict part of the sharp edges of the identified set of edges. The provided sharp edge is comprised in this strict part. Alternatively, all sharp edges of the identified set of edges may each have a neighboring convexity identical to the provided sharp edge.

In examples, a sharp edge has a neighboring convexity identical to the provided sharp edge if the sharp edge is located in a first part of the B-rep, the provided sharp edge being located in a second part of the B-rep, and the first and second part of the B-rep have the same convexity relatively to an inward orientation of the B-rep.

Thus, upon the providing of the sharp edge, the method automatically identifies and selects (e.g. all) sharp edges which are directed relatively like the provided sharp edge (since the selected sharp edges are comprised in the set of edges) and which have an identical neighboring convexity. The method thus automatically selects several edges which are relatively like the provided sharp edge from a geometrical and topological point of view. The method thus performs an efficient and accurate like-edge detection.

In examples, the identified set of edges represents one or more paths of a cutting tool for machining a geometry corresponding to an outer surface portion of the mechanical part defined along the set of edges. Each path of the one or more path may correspond to a trajectory of the cutting tool, during its continuous application. The provided sharp edge may represent a location on a path of the one or more paths that is an intermediate location, e.g. that is not an extremity of the path. Alternatively, the provided sharp edge may represent a location that is an extremity of one or more paths of the one or more paths. In these examples, sharp edges among the identified set of edges which have a neighboring convexity identical to the one of the provided sharp edge represent a turn (e.g. a bend) of a trajectory of the cutting tool during its continuous application. In other words, these sharp edges each represent one spot (e.g. location) on a path of the cutting tool where the cutting tool turns during its continuous application. In these examples, edges of the identified set of edges which do not have a neighboring convexity identical to the one of the provided sharp edge do not represent a turn of the cutting tool. By only selecting sharp edges which have a neighboring convexity identical to the provided sharp edge, the method selects automatically (e.g. all) sharp edges representing a turn of the cutting tool and automatically discards sharp edges which do not represent a turn of the cutting tool.

In examples, the neighboring convexity of an edge is the couple of the convexity types of its end vertices. In these examples, an end vertex of the edge has the concave type if all edges sharing the vertex are concave edges. In these examples, an end vertex of the edge has the convex type if all edges sharing the vertex are convex edges. In these examples, an end vertex of the edge has the both concave and convex type if at least one edge sharing the vertex is a concave edge and at least one edge sharing the vertex is a convex edge.

Figure 31:
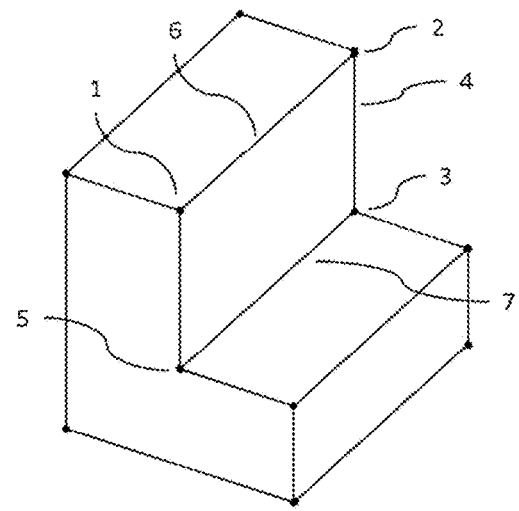

An implementation of the notion of neighboring convexity of an edge is now discussed. Precisely, let u be an edge and node x and y its end vertices. Note $v_i$, i=1, . . . , n all edges sharing vertex x and note $w_j$, j=1, . . . , m all edges sharing vertex y. One of edges $v_i$ is edge u and one of edges $w_j$ is also edge u. Vertex x is said to have the convex type if all edges $v_i$, i=1, . . . , n are convex. Vertex x is said to have the concave type if all edges $v_i$, i=1, . . . , n are concave. Otherwise, if at least one of the $v_i$ is convex and another one of the $v_i$ is concave, then vertex x is said to have the both concave and convex type. Vertex y is said to have the convex type if all edges $w_i$, i=1, . . . , n are convex. Vertex y is said to have the concave type if all edges $w_i$, i=1, . . . , n are concave. Otherwise, if at least one of the $w_i$ is convex and another one of the $w_i$ is concave, then vertex y is said to have the both concave and convex type. The neighboring convexity of edge u is the couple of convexities types of its end vertices x and y. The neighboring convexity of edge u may thus be (concave type, concave type), (concave type, convex type), (convex type, convex type), (both concave and convex type, concave type), (both concave and convex type, convex type) or (both concave and convex type, both concave and convex type). The neighboring convexity (convex type, concave type) is equivalent to the neighboring convexity (concave type, convex type). The neighboring convexity (concave type, both concave and convex type) is equivalent to the neighboring convexity (both concave and convex type, concave type). The neighboring convexity (both concave and convex type, convex type) is equivalent to the neighboring convexity (convex, both concave and convex type). FIG. 31 illustrates the notion of neighboring convexity. FIG. 31 shows a B-rep having edges 1, 2, 3, 4, 5, 6 and 7. The neighboring convexity of edge 6 is (convex type, convex type) because the end vertices 1 and 2 of edge 6 both have the convex type. The neighboring convexity of edge 7 is (both concave and convex type, both concave and convex type) because both end vertices 3 and 5 of edge 7 have the both concave and convex type. The neighboring convexity of edge 4 is (both concave and convex type, convex type) because end vertex 3 has the both concave and convex type and end vertex 2 has the convex type.

Sharp edges 1, 2, 3, 4, 5, 6 of the example of FIGS. 25-27 are selected because they all have the neighboring convexity (convex type, concave type) of the provided sharp edge 1. Sharp edges 1, 2, 3, 4 of FIGS. 28-30 are selected because they all have the neighboring convexity (convex type, concave type) of the provided sharp edge 1.

Figure 32:
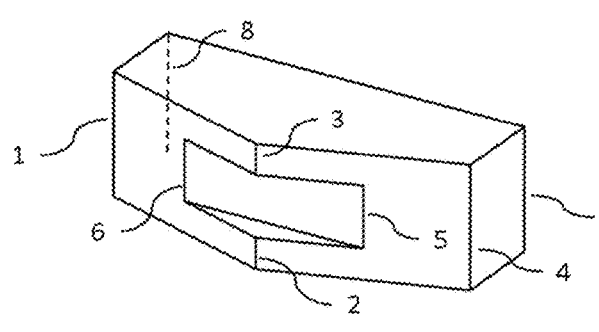
Figure 33:
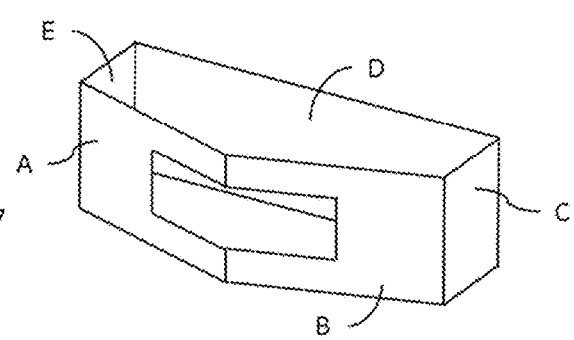

FIGS. 32-33 show an example of a B-rep having sharp edges 1, 2, 3, 4, 5, 6, 7 and 8, as illustrated in FIG. 32. FIG. 33 shows face A shared by edges 1, 2, 3 and 6, face B shared by edges 2, 3, 4 and 5, face C shared by edges 4 and 7, face D shared by 7 and 8 and face E shared by edges 8 and 1. FIG. 36 shows the dual graph of the B-rep of FIG. 32 and FIG. 33. The dual graph comprises two cycles and captures a ribbon. Edge 1 is the provided sharp edge. The identified set of edges consists in edges 1, 2, 3, 4, 5, 6, 7 and 8. Theses edges are edges of a ribbon captured by the dual graph with two cycles of FIG. 36. Edges 2, 3 and 6 are identified because they share face A with edge 1 and are directed similarly to edge 1. Edges 5 and 4 are identified because they share face B with edge 2 and are directed similarly to edge 2. Edge 7 is identified because it shares face C with edge 4 and is directed similarly to edge 4. Edge 8 is identified because it shares face E with edge 1 and is directed similarly to edge 4. The provided sharp edge 1 has the neighboring convexity (convex type, convex type). Thus, sharp edges 2, 3, 4, 7, 8 are selected because they all have the neighboring convexity (convex type, convex type). Sharp edges 5 and 6 are not selected because they both have the neighboring convexity (both concave and convex type, both concave and convex type). The B-rep of FIG. 32-33 represents a mechanical part which is first molded and then machined. FIG. 34 shows the B-rep representing the mechanical part after the molding process, and FIG. 35 shows the mechanical part after the machining process, where the notch has been machined. Sharp edges 1, 2, 3, 4, 7, 8 are selected because they represent a path of a cutting tool used for machining the geometry of a mold which shapes the geometry of the outer surface of the molded mechanical part of FIG. 34. Sharp edge 5 and 6 are not selected, because they represent boundaries of the machined notch, which did not exist during the first molding process of the mechanical part and is machined during a machining process.

In examples, the set of edges corresponds to one or a plausible combination of a mass reduction feature (i.e. performing a mass reduction function), a space reservation feature (i.e. performing a space reservation function), a fixture feature (i.e. performing a fixture function), a tightness feature (i.e. performing a tightness), an adjustment feature (i.e. performing an adjustment function), a mechanical joint feature (i.e. performing a mechanical joint function function), a cooling feature (i.e. performing a cooling function), a stiffening feature (i.e. performing a stiffening function), a positioning feature (i.e. performing a positioning function) and/or a support for all machined and drilled protrusion feature (i.e. performing a support for all machined and drilled protrusion function).

A feature is a layout of material of the mechanical part, the layout of material performing a mechanical function. In examples, the feature has a geometry, which represents and/or corresponds to and/or forms the layout of material. The set of edges may correspond to the feature. In examples, it means that at least a part (e.g. the totality) of the geometry of the feature is represented by the part of the B-rep formed by the edges of the set and (e.g. all) couples of faces sharing the edges of the set and/or (e.g. all) faces bounded by edges of the set. In examples, the part of the B-rep is arcwise connected.

In examples, the set of edges represents one or more paths of a cutting tool for machining a geometry corresponding to an outer surface portion of the mechanical part defined along the set of edges. In these examples, the outer surface portion of the mechanical part may be the outer surface portion of the geometry of one or more features. In other words, the set of edges both corresponds to the one or more features (e.g. one or a plausible combination of features) of the mechanical part and represents the one or more paths of the cutting tool, because the geometry machined by applying continuously the cutting tool along the one or more paths corresponds to the geometry of the one or more features.

In examples, the mechanical part is a molded part. In these examples, the set of edges may correspond to one or a plausible combination of a mass reduction feature, a space reservation feature and/or a stiffening feature.

Alternatively of additionally, the mechanical part may be a machined part. In these examples, the set of edges may correspond to one or a plausible combination of a mass reduction feature, a space reservation feature, a fixture feature, a tightness feature, an adjustment feature, a positioning feature, a mechanical joint feature, a cooling feature and/or a positioning pin feature.

Alternatively of additionally, the mechanical part may be a forged part. In these examples, the set of edges may correspond to one or a plausible combination of a mass reduction feature, a stiffening feature and/or a support for all machined and drilled protrusion feature.

FIGS. 1-3 show examples of mass reduction features 12, 24 and 32.

In the example of FIGS. 25-27, edges 1, 2, 3, 4, 5, 6 correspond to a mass reduction feature. In the example of FIGS. 28-29, edges 1, 2, 3, 4 correspond to a space reservation feature in a crankcase of an external shape is represented by the B-rep of FIG. 28. In the example of FIG. 32, edges 1, 2, 3, 4, 5, 6, 7, 8 correspond to a component of a linear motion guide feature. The notch corresponds to a positioning feature.

Examples of the identifying of the set of edges and of the selecting of the sharp edges are now discussed.

The identifying of the set of edges and the selecting of the sharp edges are carried out automatically. The identifying of the set of edges and the selecting of the sharp edges may thus comprise the automatic execution, e.g. by one or more processors, of one or more algorithms. One or more first algorithms of the one or more algorithms may identify the set of edges and one or more second algorithms may then select the sharp edges with the set of edges. Alternatively, the one or more algorithms may simultaneously identify the set of edges and select the sharp edges. The one or more algorithms may be any algorithm or set of algorithms adapted to identify of the set of edges and to select of the sharp edges.

The identifying of the set of edges may comprise iteratively visiting edges of the B-rep. The iterative visiting may start from the provided sharp edge. In examples, when an edge is visited, the identifying may comprise a determination that the edge is directed similarly to another edge, the other edge sharing a face with the edge being visited, the other edge having already been visited. If it is determined that the edge being visited is directed similarly to the another edge, then the edge is collected and identified as being part of the set of edges. In examples, the iterative visiting continues, until all edges of a ribbon are identified, the ribbon comprising the provided sharp edge and of which each first edge is directed similarly to at least one second edge, the first edge and the second edge sharing a face. In examples, the ribbon is the largest ribbon comprising the provided sharp edge and of which each first edge is directed similarly to at least one second edge, the first edge and the second edge sharing a face. In other words, the iterative visiting is carried out until a set of edges formed by the edges of such a ribbon is identified.

In examples, the selecting may be carried out according to a requirement. In examples, the requirement is specified (e.g. declared) by a user, e.g. before the identifying of the set of edges and the selecting of the sharp edges, e.g. by interacting with (e.g. a software of) the CAD system, e.g. by using a touch or a keyboard or a haptic device such as a mouse. In examples, the requirement is that each sharp edge within the set of edges is to be selected. Alternatively, the requirement may be that each sharp edge, within the set of edges, having a neighboring convexity identical to the provided sharp edge, is to be selected. In other words, sharp edges which do not have a neighboring convexity identical to the provided sharp edge are not selected.

In examples, the selecting is carried out during the identifying of the set of edges. For instance, once an edge is identified as being part of the set of edges, it is automatically determined whether the edge satisfies the requirement or not. If the edge satisfies the requirement, the edge is selected. In other words, sharp edges satisfying the requirement are selected within already identified edges and as the identifying of the set of edges progresses. Alternatively, the selecting of sharp edges may be carried out after the identifying, for instance by iteratively collecting edges of the identified set of edges that satisfy the requirement.

An implementation of the identifying of the set of edges and of the selecting of the sharp edges is now discussed.

The user provides the sharp edge u. The user then chooses an input option Option∈{1,2} which automatically specifies the requirement. If Option=1, the requirement is that each sharp edge within the set of edges is to be selected. If Option=2, the requirement is that each sharp edge, within the set of edges, having a neighboring convexity identical to the provided sharp edge, is to be selected. The output is the set S of the selected sharp edges. Set S is initialized by the empty set. The algorithm runs a function Ribbon(•) twice for the edge u. The first call involves edge u according to one (arbitrary) orientation, noted +u, and the second call involves edge u according to the reverse orientation, noted −u. The set S is determined according to the following pseudo-code:

$$S:=S\cup\text{Ribbon}(+u,\alpha,\text{Option})\cup\text{Ribbon}(-u,\alpha,\text{Option})$$

The function Ribbon(•) identifies edges of a ribbon which comprises the provided sharp edge u, each first edge of the ribbon forming an angle lower than the predetermined threshold $\alpha$ with at least a second edge of the ribbon. The function Ribbon(•) further selects the sharp edges according to the requirement. A unique last-in-first-out (LIFO) list is used through standard instructions Push(•), Pop(•) and Size. Instruction Push(Z) adds object Z on top of the list and increments its size. Instruction Pop(Z) yields the last object of the list, noted Z, removes it from the list and decrements its size. Edges are oriented, meaning that, if v is an internal edge, method Adj(v) returns the only face of the B-Rep bounded by edge v according to its orientation and Adj(−v) returns the other face, as illustrated in FIG. 37. If w is a boundary edge, and if Adj(w) (resp. Adj(−w)) returns the face bounded by w then Adj(−w) (resp. Adj(w)) returns the empty set. For example, according to FIG. 37, Adj(b) returns the rightmost face while Adj(−b) returns the empty set. The function Ribbon(•) comprises a function ∂(f) which returns the list of oriented edges bounding face f. The function Ribbon(•) is described by the following pseudo-code:

```
Ribbon(u, α, Option)
  X := {u}
  Push(−u)
  While Size > 0 do begin
    Pop(v)
    W:= ∂(Adj(v)) − {v}
```

```
        For each edge w ∈ W do begin
            If w ∉ X and SameAngle(v,w,α) and (SameNC(v,w) or
        Option = 1) then
                If w is sharp then
                    X := X ∪ {w}
                End if
            End if
            Push(-w)
        End for
    End while
    Return X
```

The instruction SameAngle(v,w,α) returns "true" if the angle between v and w is lower than the predetermined threshold α and "false" otherwise. The instruction SameAngle(v,w,α) may comprise a determination that the angle between v and w is lower than α, the determination being carried out according to formula (1). The instruction SameNC(v,w) returns "true" if v and w have the same neighboring convexity and "false" otherwise. The instruction W:=∂(Adj(v))−{v} returns the set W including oriented boundary edges of the unique face bounded by oriented edge v but excluding edge v itself. For example, it returns oriented edges a, b and c as illustrated in FIG. 37. In addition, edge b being a boundary edge, Adj(-b)=∅ and W=∂(Adj(-b))−{-b}=∅ as well.

In the example of FIGS. 25-27, running the previous algorithm with Option=1 selects the sharp edges 1, 2, 3, 4, 5, 6. In the example of FIGS. 28-30, running the previous algorithm with Option=1 or Option=2 selects the sharp edges 1, 2, 3, 4. In the example of FIGS. 32-33, running the previous algorithm with Option=2 selects the sharp edges 1, 2, 3, 4, 7, 8.

The method allows the simultaneous multi-selection of sharp edges. The selected sharp edges are part of the identified set of edges, which may be made of edges of a ribbon, and which contain the provided sharp edge. In other words, the selected sharp edges are relatively like the provided sharp edge. The selection of the sharp edges being carried out automatically and upon the providing of the sharp edge (e.g. by a user), the method thus provides an efficient and ergonomic like-edge multi-selection. Selected sharp edges may in addition be the sharp edges of the identified set of edges that each have a neighboring convexity identical to the one of the provided sharp edge. In other words, the method allows the multi-selection of edges which, in addition of being relatively geometrically like the provided sharp edge (since the selected sharp edges are directed relatively similarly to the provided sharp edge), are also topologically like the provided sharp edge (since their neighboring convexities are identical). The method thus allows for an ergonomic and efficient multi-selection of edges according a geometrical similarity requirement and, optionally, according to a geometrical and topological similarity requirement. Moreover, the identified set of edges may represent one or more paths of a cutting tool for machining a geometry corresponding to an outer surface portion of the mechanical part defined along the set of edges. The selected sharp edges may represent turns of the cutting tool along these one or more paths. Thus method allows thus to recognize automatically a part of the B-rep representing the one or more paths of the cutting tool and the turns of the cutting tool along these one or more paths. Requiring the selected sharp edges to have the same neighboring convexity than the provided sharp edge allows to differentiate sharp edges which truly correspond to turns of the cutting tool (i.e. the sharp edges which are selected) from those which do not, despite they are relatively geometrically like to the provided sharp edge. The method is thus robust and efficient.

In examples, the method further comprises, applying a same fillet operation or round operation to the selected sharp edges.

Applying a fillet (resp. round) operation to a sharp edge comprises replacing the sharp edge by a smooth transition. The smooth transition is a concave (resp. convex) face which is the envelope of a rolling ball connecting the adjacent faces of the sharp edge. For examples, the convex edge 220 of FIG. 22 is replaced by the round face 230 of FIG. 23 as a result of applying a round operation to the convex edge 220. For examples, the concave edge 222 of FIG. 22 is replaced by the fillet face 232 of FIG. 23 as a result of applying a fillet operation to the concave edge 222. As previously discussed with reference to FIGS. 22-24, a fillet (resp. round) face may be parameterized $S:[a,b]\times[c,d]\to \mathbb{R}^3$ with $(u,v)\mapsto S(u,v)$ is such that for all $u\in[a,b]$ the curve $v\mapsto S(u,v)$ is a portion of a circle the radius of which does not depend on u. Or, for all $v\in[c,d]$ the curve $u\mapsto S(u,v)$ is a portion of the circle the radius of which does not depend on v. The radius of the fillet (resp. round) operation designates the radius of the circle. In the following, the radius of the fillet (resp. round) operation may be referred to as "the radius of the concave (resp. convex) face" (i.e. the face replacing the sharp edge).

In examples, applying the same round (resp. fillet) operation to all selected sharp edges comprises applying the round (resp. fillet) operation to all selected sharp edges automatically and in a unified way. Applying the operation automatically and in a unified way to the selected sharp edges consists in: specifying (e.g. selecting, e.g. upon user action) the operation, launching (e.g. by interacting with the CAD system, e.g. upon user action) the operation, and, automatically (e.g. by the CAD system), applying the operation to all selected sharp edges (e.g. substantially) identically and/or (e.g. substantially) simultaneously. Specifying the operation may comprise selecting, e.g. by interacting with a software of the CAD system, the operation type between the fillet type and the round type. Specifying the operation may further comprise declaring (e.g. by using a keyboard), the radius of the selected round or fillet operation.

As a result of applying the same round (resp. fillet) operation to all selected sharp edges, each selected sharp edge is replaced with a smooth transition that is a convex (resp. concave) face. Each smooth transition has the same radius, which is the one of the round (resp. fillet) operation. In the example of FIGS. 32-35, the same round operation is applied to all selected edges 1, 2, 3, 4, 7, 8. As a result; they are all replaced by convex faces of same radius, as illustrated in FIG. 35.

In examples, the set of edges represents one or more paths of a cutting tool for machining a geometry corresponding to an outer surface portion of the mechanical part defined along the set of edges. In these examples, the radius of the round or fillet operation may correspond to a radius of the cutting tool.

Each selected sharp edge is replaced by a concave (resp. convex) face as a result of applying the fillet (resp. round) operation. The concave (resp. convex) face replacing the sharp edge may thus represent a cylindrical part of the geometry (i.e. a portion of the geometry of which an outer surface is an inner (resp. outer) part of a lateral face of a cylinder) which is machined by applying the cutting tool. As previously discussed, the geometry may be the geometry of an outer surface of one or more layouts of material of the mechanical part or may be shaped by the geometry of the outer surface of one or more layouts of material of a matrix. The radius of the fillet (resp. round) operation corresponds to a radius of the cutting tool in that the cylindrical part of the geometry is such that, during an application of the cutting tool, the cutting tool may be continuously in contact with all the cylindrical part of the geometry. In examples, the radius of the round (resp. fillet) operation is equal or substantially equal to the radius of the cutting tool.

In the example of FIG. 2, the geometry of the outer surface portion of the mass reduction pocket 24 of the mechanical part 20 is such that the cutting tool 22 may be continuously in contact with the outer surface portion even when the cutting tool passes over a bend of the outer surface portion of the mass reduction pocket 24.

Rounding or filleting the selected sharp edges allows design of a more realistic mechanical part. Indeed, selected sharp edges may represent turns of the cutting tool, and the cutting tool cannot be applied on sharp turns. The cutting tool can only be applied on turns which are smooth, which have a radius adapted so that the cutting tool can be continuously in contact with the machined geometry during the turn. The method allows thus to transform (e.g. all) sharp edges representing turns into smooth transitions representing (e.g. mechanically) realistic turns of the cutting tool. Furthermore, the method does so efficiently and ergonomically, since (e.g. all) sharp edges are transformed into smooth transitions automatically and in a unified way, thus without user action.

Figure 38:
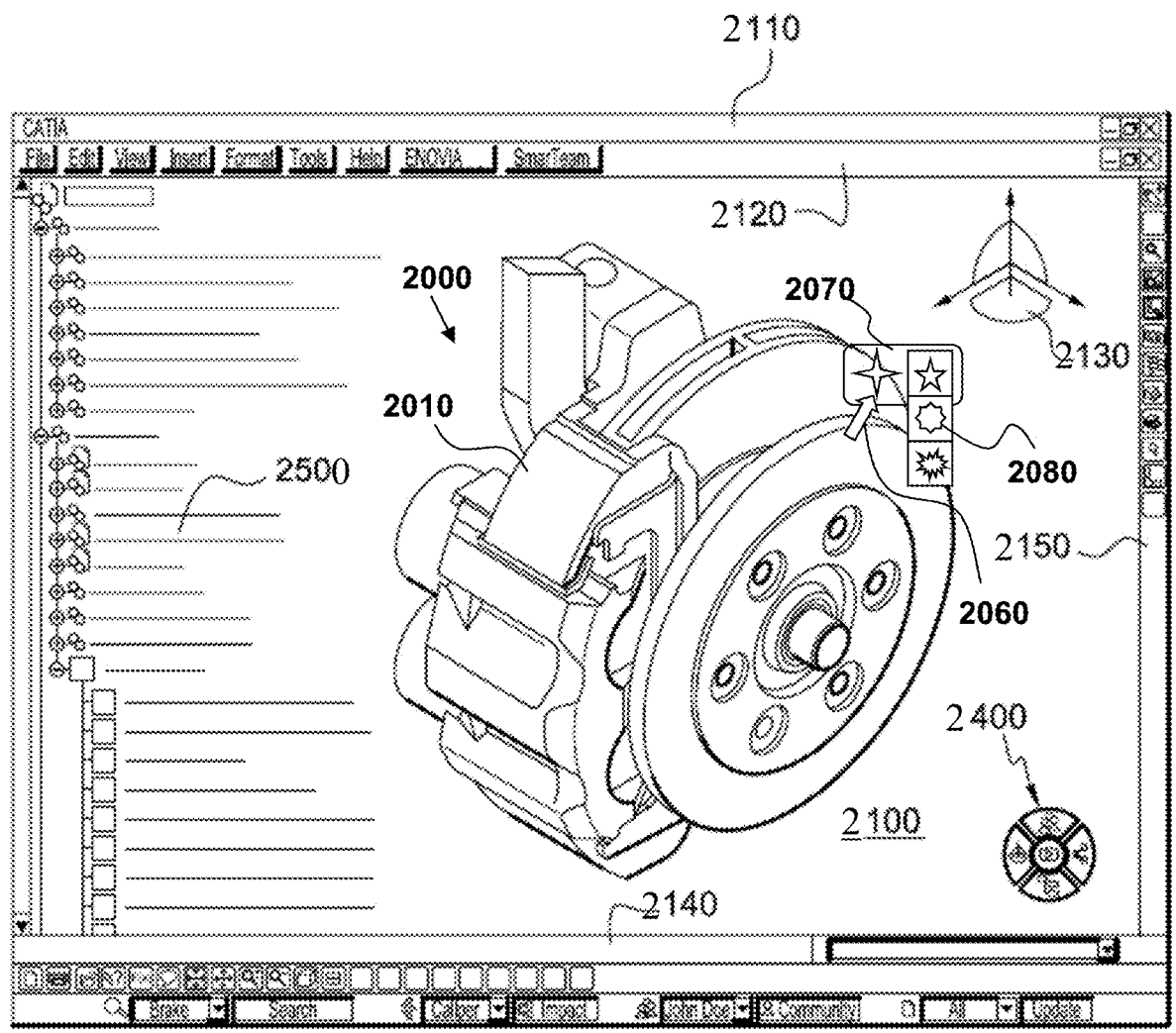
FIG. 38 shows an example of a graphical user interface of the system.

FIG. 38 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. A brake assembly such as the one represented by the 3D representation 2000 may be designed by the method. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 39:
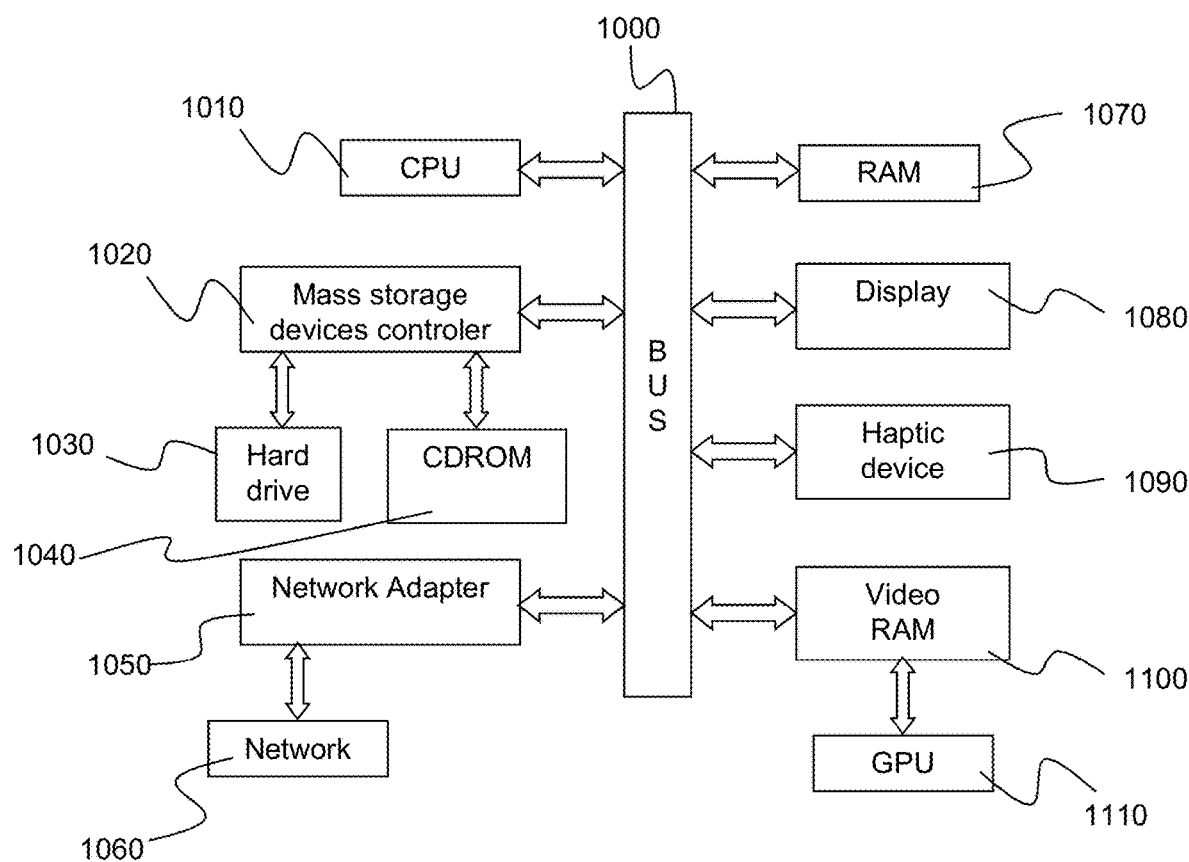
FIG. 39 shows an example of the system.

FIG. 39 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The invention claimed is:

1. A computer implemented method for designing, with a CAD system, a 3D modeled object representing a mechanical part, the method comprising:
   obtaining a B-rep representing the mechanical part, the B-rep having faces, edges and vertices;
   obtaining a sharp edge; and
   automatically by the CAD system:
   identifying a set of edges comprising the obtained sharp edge, where for each edge $u_1$ of the identified set of edges, there is at least one other edge $u_2$ of the identified set of edges, said at least one other edge $u_2$ sharing a face with the respective $u_1$, such that:

$$\max\{<y_1-x_1,y_2-x_2>,<y_1-x_1,x_2-y_2>\} \geq \cos\alpha \|y_1-x_1\|\|y_2-x_2\|,$$

where $x_1$, $y_1$ are vertices of edge $u_1$, $x_2$, $y_2$ are vertices of edge $u_2$ and $\alpha$ is a predetermined threshold, selecting sharp edges within the set of edges; and designing the 3D modelled object representing the mechanical part based on the identified set of edges comprising the obtained sharp edge.

2. The method of claim 1, wherein the predetermined threshold is a function of a manufacturing process of the mechanical part.

3. The method of claim 2, wherein the mechanical part is:
a molded or forged part having a maximal draft angle, the predetermined threshold being based on the maximal draft angle, or
a machined part having a maximal machining inclination angle, the predetermined threshold being based on the maximal machining inclination angle.

4. The method of claim 2, wherein the predetermined threshold is lower than 20°, 15°, or 10°.

5. The method of claim 1, wherein the set of edges represents one or more paths of a cutting tool for machining a geometry corresponding to an outer surface portion of the mechanical part defined along the set of edges.

6. The method of claim 5, wherein the method further comprises applying a same fillet or round operation to the selected sharp edges.

7. The method of claim 6, wherein a radius of the fillet or round operation corresponds to a radius of the cutting tool.

8. The method of claim 1, wherein the mechanical part is:
a machined part,
a molded part,
a machined mold for a molding manufacturing process,
a forged part, and/or
a machined forging matrix for a forging manufacturing process.

9. The method of claim 1, wherein the set of edges corresponds to:
a mass reduction feature,
a space reservation feature,
a fixture feature,
a tightness feature,
an adjustment feature,
a mechanical joint feature,
a cooling feature,
a stiffening feature,
a positioning feature, and/or
a support for all machined and drilled protrusion feature.

10. The method of claim 1, wherein the selected sharp edges each have a neighboring convexity identical to the obtained sharp edge, wherein the neighboring convexity of an edge is a couple of the convexity types of its end vertices, wherein:
an end vertex of the edge has a concave type if all edges sharing the vertex are concave edges,
an end vertex of the edge has a convex type if all edges sharing the vertex are convex edges, and
an end vertex of the edge has both the concave and convex type if at least one edge sharing the vertex is a concave edge and at least one edge sharing the vertex is a convex edge.

11. A non-transitory data storage medium having recorded thereon a computer program comprising instructions for performing a method for designing, with a CAD system, a 3D modeled object representing a mechanical part, the method comprising:

obtaining a B-rep representing the mechanical part, the B-rep having faces, edges and vertices;
obtaining a sharp edge; and
automatically by the CAD system:
identifying a set of edges comprising the obtained sharp edge, where for each edge $u_1$ of the identified set of edges, there is at least one other edge $u_1$ $u_2$ of the identified set of edges, said at least one other edge $u_2$ sharing a face with the respective edge $u_1$, such that:

$$\max\{<y_1-x_1,y_2-x_2>,<y_1-x_1,x_2-y_2>\} > \cos\alpha \|y_1-x_1\|\|y_2-x_2\|, \text{ where}$$

$x_1$, $y_1$ are vertices of edge $u_1$, $x_2$, $y_2$ are vertices of edge $u_2$ and $\alpha$ is a predetermined threshold,
selecting sharp edges within the set of edges; and designing the 3D modelled object representing the mechanical part based on the identified set of edges comprising the obtained sharp edge.

12. The data storage medium of claim 11, wherein the predetermined threshold is a function of a manufacturing process of the mechanical part.

13. The data storage medium of claim 12, wherein the mechanical part is:
a molded or forged part having a maximal draft angle, the predetermined threshold being based on the maximal draft angle, or
a machined part having a maximal machining inclination angle, the predetermined threshold being based on the maximal machining inclination angle.

14. A computer comprising:
a processor coupled to a memory and a display, the memory having recorded thereon a computer program comprising instructions for designing, with a CAD system, a 3D modeled object representing a mechanical part that when executed by the processor causes the processor to be configured to:
obtain a B-rep representing the mechanical part, the B-rep having faces, edges and vertices,
obtain a sharp edge, and
automatically by the CAD system:
identify a set of edges comprising the obtained sharp edge, where for each edge $u_1$ of the identified set of edges, there is at least one other edge $u_1$ and $u_2$ of the identified set of edges, said at least one other edge u, sharing a face with the respective edge $u_1$, such that:

$$\max\{<y_1-x_1,y_2-x_2>,<y_1-x_1,x_2-y_2>\} > \cos\alpha \|y_1-x_1\|\|y_2-x_2\|, \text{ where}$$

$x_1$, $y_1$ are vertices of edge $u_1$, $x_2$, $y_2$ are vertices of edge $u_2$ and $\alpha$ is a predetermined threshold,
select sharp edges within the set of edges; and designing the 3D modelled object representing the mechanical part based on the identified set of edges comprising the obtained sharp edge.

15. The computer of claim 14, wherein the predetermined threshold is a function of a manufacturing process of the mechanical part.

16. The computer of claim 15, wherein the mechanical part is:
a molded or forged part having a maximal draft angle, the predetermined threshold being based on the maximal draft angle, or
a machined part having a maximal machining inclination angle, the predetermined threshold being based on the maximal machining inclination angle.

* * * * *

UNITED STATES PATENT AND TRADEMARK OFFICE
CERTIFICATE OF CORRECTION

PATENT NO. : 11,295,040 B2
APPLICATION NO. : 16/727169
DATED : April 5, 2022
INVENTOR(S) : Laurent Marini et al.

Page 1 of 1

It is certified that error appears in the above-identified patent and that said Letters Patent is hereby corrected as shown below:

In the Claims

In Column 24, Claim 11, Line 7, delete "$u_1$".

In Column 24, Claim 14, Line 43, delete "$u_1$ and".

In Column 24, Claim 14, Line 44, delete "u," and insert -- $u_2$ --, therefore.

Signed and Sealed this
Twenty-fourth Day of May, 2022

Katherine Kelly Vidal
*Director of the United States Patent and Trademark Office*